United States Patent
Pratt

(10) Patent No.: US 10,140,139 B1
(45) Date of Patent: *Nov. 27, 2018

(54) ENSURING THE PRIVACY AND INTEGRITY OF A HYPERVISOR

(71) Applicant: Bromium, Inc., Cupertino, CA (US)

(72) Inventor: Ian Pratt, Cambridge (GB)

(73) Assignee: Bromium, Inc., Cupertino, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 14/741,147

(22) Filed: Jun. 16, 2015

Related U.S. Application Data

(63) Continuation-in-part of application No. 13/526,755, filed on Jun. 19, 2012, now Pat. No. 9,021,476, and a continuation-in-part of application No. 13/526,769, filed on Jun. 19, 2012, now Pat. No. 9,135,046.

(51) Int. Cl.
*G06F 9/455* (2018.01)
*G06F 9/50* (2006.01)

(52) U.S. Cl.
CPC ........ *G06F 9/45558* (2013.01); *G06F 9/5016* (2013.01); *G06F 9/5077* (2013.01); *G06F 2009/45587* (2013.01)

(58) Field of Classification Search
CPC .................. G06F 9/468; G06F 9/5077; G06F 2009/45587; G06F 9/5016; G06F 9/45533; G06F 9/45558
USPC .......................................................... 718/1
See application file for complete search history.

(56) References Cited

U.S. PATENT DOCUMENTS

| | | | |
|---|---|---|---|
| 5,657,388 A * | 8/1997 | Weiss | G06F 21/34 235/379 |
| 6,496,847 B1 | 12/2002 | Bugnion et al. | |
| 6,820,142 B2 * | 11/2004 | Hofstee | G06F 13/28 710/23 |
| 6,944,699 B1 | 9/2005 | Bugnion et al. | |
| 7,418,584 B1 | 8/2008 | Klaiber et al. | |
| 7,636,800 B2 | 12/2009 | Ben-Yehuda et al. | |
| 7,665,088 B1 | 2/2010 | Bugnion et al. | |
| 7,739,514 B2 | 6/2010 | Bangui | |

(Continued)

OTHER PUBLICATIONS

Muli Ben-Yehuda, Jon D. Mason "The Xen Hypervisor and Its IO Subsystem, virtualizaing a machine near you", System and storage seminar 2005, IBM Haifa Research Lab, Slides 1-40.*

*Primary Examiner* — Bradley A Teets
*Assistant Examiner* — Willy W Huaracha
(74) *Attorney, Agent, or Firm* — Brokaw Patent Law PC; Christopher J. Brokaw

(57) ABSTRACT

Approaches for ensuring the privacy and integrity of a hypervisor. A host operating system manages a set of resources. The host operating system is prevented from accessing a portion of the resources belonging to or allocated by the hypervisor. The host operating system may be prevented from accessing resources belonging to or allocated by the hypervisor by transferring execution of the host operating system into a virtual machine container that does not have sufficient privilege to access any portion of the memory pages in which the hypervisor is executing. After the host operating system provides a requested resource to the hypervisor, the hypervisor may use a hardware component that establishes and enforces constraints on what portions of memory the host operating system is allowed to access to protect the requested resource from the host operating system.

25 Claims, 3 Drawing Sheets

(56) References Cited

U.S. PATENT DOCUMENTS

| | | | |
|---|---|---|---|
| 7,865,893 B1* | 1/2011 | Omelyanchuk | G06F 11/3644 |
| | | | 710/1 |
| 7,904,540 B2 | 3/2011 | Hadad et al. | |
| 8,042,163 B1* | 10/2011 | Karr | G06F 3/062 |
| | | | 713/164 |
| 8,151,032 B2 | 4/2012 | Oshins | |
| 8,261,265 B2 | 9/2012 | Chen et al. | |
| 8,370,838 B1 | 2/2013 | Omelyanchuk et al. | |
| 8,484,392 B2 | 7/2013 | Manula et al. | |
| 8,539,137 B1 | 9/2013 | Protassov et al. | |
| 8,549,210 B2 | 10/2013 | Hunter et al. | |
| 8,555,081 B2 | 10/2013 | Chen et al. | |
| 8,555,377 B2 | 10/2013 | Pate | |
| 8,893,306 B2* | 11/2014 | Rosu | G06F 9/545 |
| | | | 711/6 |
| 9,021,476 B1 | 4/2015 | Pratt | |
| 9,361,244 B2* | 6/2016 | Hiremane | G06F 21/575 |
| 2003/0229794 A1* | 12/2003 | Sutton, II | G06F 12/1491 |
| | | | 713/189 |
| 2005/0021936 A1 | 1/2005 | Bailey et al. | |
| 2005/0132365 A1 | 6/2005 | Madukkarumukumana et al. | |
| 2007/0239804 A1* | 10/2007 | Armstrong | G06F 11/1438 |
| 2008/0065854 A1* | 3/2008 | Schoenberg | G06F 9/45537 |
| | | | 711/203 |
| 2008/0140866 A1 | 6/2008 | Corry et al. | |
| 2008/0201550 A1 | 8/2008 | Bailey et al. | |
| 2008/0235793 A1* | 9/2008 | Schunter | G06F 12/145 |
| | | | 726/22 |
| 2009/0113110 A1* | 4/2009 | Chen | G06F 9/4426 |
| | | | 711/6 |
| 2009/0113216 A1 | 4/2009 | Chen et al. | |
| 2009/0113425 A1 | 4/2009 | Ports et al. | |
| 2009/0119684 A1 | 5/2009 | Mahalingam et al. | |
| 2010/0077063 A1 | 3/2010 | Amit et al. | |
| 2010/0332212 A1 | 12/2010 | Finkelman | |
| 2011/0010483 A1* | 1/2011 | Liljeberg | G06F 12/1441 |
| | | | 711/6 |
| 2012/0102252 A1 | 4/2012 | Tsirkin | |
| 2013/0055254 A1 | 2/2013 | Avasthi et al. | |
| 2013/0097354 A1* | 4/2013 | Arges | G06F 12/1458 |
| | | | 711/6 |
| 2013/0132690 A1* | 5/2013 | Epstein | G06F 12/1416 |
| | | | 711/159 |
| 2013/0155083 A1 | 6/2013 | McKenzie et al. | |
| 2018/0045189 A1* | 2/2018 | Lee | G06F 21/72 |

\* cited by examiner

ENSURING THE PRIVACY AND INTEGRITY OF A HYPERVISOR

CLAIM OF PRIORITY AND RELATED APPLICATION DATA

This application is a continuation-in-part of, and claims priority to, U.S. patent application Ser. No. 13/526,755 (now U.S. Pat. No. 9,021,476), entitled Ensuring the Privacy and Integrity of a Hypervisor, filed Jun. 19, 2012, invented by Ian Pratt, the disclosure of which is incorporated by reference for all purposes as if fully set forth herein.

This application is a continuation-in-part of, and claims priority to, U.S. patent application Ser. No. 13/526,769, entitled Securing a Controller of a Device from a Host Operating System, filed Jun. 19, 2012, invented by Ian Pratt, the disclosure of which is incorporated by reference for all purposes as if fully set forth herein.

FIELD OF THE INVENTION

Embodiments of the invention relate to ensuring the privacy and integrity of a hypervisor.

BACKGROUND

A hypervisor is a software component that enables multiple operating systems (termed "guest operating systems") to run on a single device. Each guest operating system is executed within a separate virtual machine.

There are two widely recognized types of hypervisors, termed Type 1 and Type 2. A Type 1 hypervisor (also known as a native, bare metal hypervisor) executes directly upon the hardware of the device. With a Type 1 hypervisor, a guest operating system runs on a level above the hypervisor. Since a Type 1 hypervisor executes directly upon the hardware, a Type 1 hypervisor is the most privileged software component within the system.

A Type 2 hypervisor (also known as a hosted hypervisor) executes within a conventional operating system (termed the "host operating system" in this context). A Type 2 hypervisor instantiates guest operating systems using the memory and resources allocated to the hypervisor by the host operating system. As with a Type 1 hypervisor, guest operating systems run at a lower privilege level than the hypervisor. However, unlike a Type 1 hypervisor, a Type 2 hypervisor is not the most privileged component within the system. Instead, in a system employing a Type 2 hypervisor, the host operating system is at the same privilege level as the Type 2 hypervisor, and hence, the host operating system can interfere with the Type 2 hypervisor.

If malicious code infects a host operating system that employs a Type 2 hypervisor, then the malicious code could potentially compromise the Type 2 hypervisor, since processes executing within the host operating system kernel are running at the same privilege level as the Type 2 hypervisor. It is desirable to prevent a Type 2 hypervisor (and by extension guest virtual machines) from being compromised from any malicious code executing within the host operating system.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for ensuring the privacy and integrity of a hypervisor are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention protect the privacy and integrity of a hypervisor executing within a host operating system. To do so, embodiments enable the hypervisor to be the most privileged software component operating within a system. For example, using an embodiment, the hypervisor is more privileged than the host operating system. In this way, processes executing outside of the hypervisor (such as those processes executing within the host operating system) cannot affect the privacy or integrity of the hypervisor.

In an embodiment, to secure the hypervisor, the host operating system is prevented from accessing a portion of resources belonging to or allocated by a hypervisor to prevent the host operating system from violating the privacy and integrity of those resources. In an embodiment, the host operating system may be prevented from accessing resources belonging to or allocated by the hypervisor by transferring execution of the host operating system into a virtual machine container that does not have sufficient privilege to access any portion of the memory pages in which the hypervisor is executing.

A wide variety of resources of the hypervisor may be protected in this manner. For example, non-limiting, illustrative examples of the types of resources of the hypervisor which may be protected in this manner include memory, scheduling access to a central processing unit (CPU), and access to one or more input/output devices.

Preventing the Host from Accessing Hypervisor Resources

Figure 1:
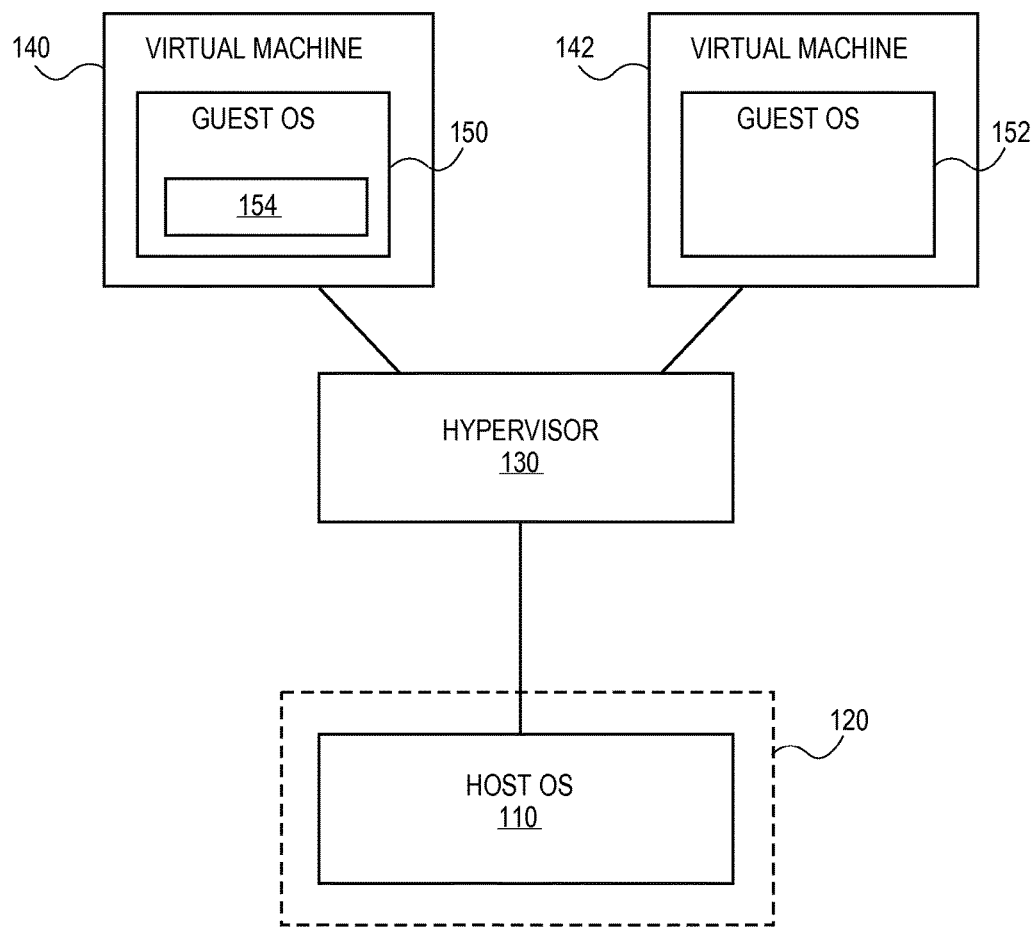
FIG. 1 is a block diagram illustrating an exemplary system according to an embodiment of the invention.

FIG. 1 is a block diagram illustrating an exemplary system 100 according to an embodiment of the invention. System 100 includes a set of software components, namely host operating system 110 (hereafter "host OS 110"), hypervisor 130, and virtual machines 140 and 142. The software components of system 100 may reside and operate on a wide variety of physical devices. For example, non-limiting, illustrative examples of the types of physical devices upon which system 100 may reside and operate include a personal computer (PC), a tablet PC, a laptop computer, a cell phone, a personal digital assistance (PDA), and the like.

Host OS 110 is intended to broadly represent any type of operating system which is capable of managing a set of resources. Hypervisor 130 is intended to broadly represent any type of hypervisor that executes within host OS 110. Hypervisors that execute within a host operating system may be referred to as Type 2 hypervisors; although, as shall be evident from the present teachings, hypervisor 130 of an embodiment operates differently than Type 2 hypervisors known in the art.

Hypervisor 130 is capable of creating and managing a plurality of different operating systems (conventionally termed "guest operating systems") using the memory and other resources available to hypervisor 130. Guest operating systems within system 100 are intended to execute within a virtual machine. FIG. 1 depicts guest operating systems (hereafter simply guest OS) 150 and 152 which execute within virtual machines 140 and 142 respectively.

While FIG. 1 only depicts two virtual machines, it will be evident to those in the art that hypervisor 130 may create any number of virtual machines. Furthermore, hypervisor 130 may, at various times, de-allocate a particular virtual machine when it is no longer needed. Therefore, the number of virtual machines, and by extension the number of guest operating systems, within system 100 may vary over time and from implementation to implementation.

Resources, such as memory, access to the CPU, and access to an I/O device, may be assigned or allocated to hypervisor 130. Hypervisor 130, in turn, may allocate a certain portion of these resources to a virtual machine instantiated by hypervisor 130.

Each guest operating system may comprise one or more components that issue requests to perform operations (such as an I/O operation) to host OS 110 via hypervisor 130. FIG. 1 depicts an example of such components in guest OS 150 as device driver component 154. Device driver component 154 may require access to resources, such as access to a persistent storage, a network, or the CPU. Host OS 110 will process requests originating from device driver component 154 for access to resources. Device driver component 154 may, in certain embodiments, correspond to a paravirtual device driver that is designed specifically for a hypervisor environment or to a hardware device driver designed to communicate with a hardware component, which in a hypervisor environment communicates with an emulation of that hardware device.

In an embodiment, to prevent host OS 110 from accessing resources belonging to or allocated by hypervisor 130, execution of host OS 110 is transferred into virtual machine container 120. Virtual machine container 120, as broadly used herein, refers to any container, abstraction, or mechanism which may be used to enforce and manage access to a bounded area of memory. For example, virtual machine container 120 may be implemented as a VMCS container provided by certain Intel® hardware by an embodiment. Virtual machine container 120 is designed or configured to have insufficient privilege to access any portion of the set of memory pages in which hypervisor 130, or any virtual machine instantiated thereby, reside. Therefore, processes executing within virtual machine container 120 cannot access resources assigned to or allocated by hypervisor 130, but for certain exceptions discussed below.

Embodiments may employ different mechanisms to ensure that virtual machine container 120 lacks sufficient privilege to access resources allocated to or by hypervisor 130. One way for doing so is by removing reference to the set of memory pages in which hypervisor 130 resides from the Extended Page Tables (EPT) of host OS 110. Extended Page Tables are tables used by a Memory Management Unit (MMU) to map guest-physical addresses to host-physical addresses. Thus, in an embodiment, the Extended Page Tables of virtual machine container 120 allows host OS 110 to access the memory and other resources host OS 110 is supposed to possess, but not the memory and other resources belonging to or allocated by hypervisor 130. Hardware components, such as a MMU, may establish and enforce constraints on what portions of memory host OS 110 is allowed to access based on data within the Extended Page Tables.

Embodiments may take different approaches for establishing host OS 110 within virtual machine container 120. For example, in one embodiment, initially, host OS 110 boots. Thereafter, after booting host OS 110, host OS 110 is transferred into a virtual machine container 120. In a different approach, prior to booting host OS 110, a portion of machine memory that host OS 110 cannot access is reserved. This reserved area of memory may be a VMCS container in an embodiment. Thereafter, hypervisor 130 is instantiated within the reserved portion of memory which host OS 110 cannot access.

In an embodiment, once host OS 110 is prevented from accessing any resources belonging to or allocated by hypervisor 130, devices under the control of host OS 110 are prevented from performing unauthorized direct memory accesses (DMA) to resources belonging to or allocated by hypervisor 130 by means of configuring the input/output memory management unit (IOMMU). However, that is not to say that host OS 110, or devices under control of host OS 110, can never access the resources belonging to or allocated by hypervisor 130. Indeed, in the natural course of operation, hypervisor 130 will rely upon host OS 110 to perform certain activity, such as I/O operations, on behalf of hypervisor 130 and virtual machines 140 and 142.

To balance the need to have host OS 110 perform I/O operations for hypervisor 130 while minimizing the scope of access afforded to host OS 110, in embodiments of the invention, hypervisor 130 may provide host 110 temporary access to those memory pages involved in the performance of an operation (such as an I/O operation). Thereafter, hypervisor 130 may revoke access to those memory pages from host OS 110, presumably once the I/O operation has been performed. In this way, host OS 110 only has access to those memory pages necessary to perform the operations it has been requested to perform by hypervisor 130 or virtual machines 140 and 142.

To illustrate a concrete example, hypervisor 130 or virtual machines 140 and 142 may provide host OS 110 temporary access to a set of memory pages by granting a token to host OS 110. Thus, when host OS 110 performs an I/O operation it can present the token to the hypervisor 130 to facilitate the reading from or writing to the location of memory identified by the token as required by the requested operation.

Rather than providing a memory address to hypervisor 130 to identify a set of memory pages at which a requested operation is to be performed, host OS 110 need only provide a token. When host OS 110 wishes to read or write to a set of memory pages allocated to hypervisor 130, host OS 110 notifies hypervisor 130 that host OS 110 desires that a particular operation be performed against a set of memory pages and provides a token for those memory pages to hypervisor 130. If the token is valid, then hypervisor 130 will permit the read or write operation to the set of memory pages identified by the token. Hypervisor 130 will subsequently revoke the temporary permission to write to that location in memory from host OS 110 by causing the token to become invalid. If the token is invalid, then hypervisor 130 will not permit the operation to be performed by host OS 110.

If a guest operating system uses a paravirtual device driver, then the paravirtual device driver will make an explicit request to hypervisor 130 to allow host OS 110 access to a particular area of memory for purposes of performing IO operations. If the device driver component 154 is for a regular hardware device, then hypervisor 130 will have to parse the instructions given to device driver component 154 for the emulated hardware to identify the areas of memory in which the guest operating system is implicitly desiring IO operations to be performed against.

Ensuring the Privacy and Integrity of Hypervisor Memory

When hypervisor 130 or a guest OS desires an I/O operation to be performed, hypervisor 130 will ask host OS 110 to perform the I/O operation. As explained above, in doing so, hypervisor 130 will provide a token to host OS 110 so that host OS will have temporary access to a set of memory pages in which the I/O operation is to be performed. In an embodiment, either hypervisor 130 or a guest operating system may encrypt data before the data is provided to host OS 110 so that host OS 110 may perform an I/O operation using an encrypted version of the data rather than the original version. In this way, host OS 110 only has access to an encrypted version of the data and any programs executing within host OS 110 cannot inspect the encrypted version of the data. As a result, the privacy of hypervisor 130 and guest OSes is ensured since other components cannot inspect data written or read by hypervisor.

To illustrate using an embodiment where hypervisor 130 is responsible for encrypting the data, if hypervisor 130 instructs host OS 110 to write a page of memory to disk, then hypervisor 130 may encrypt the page of memory to create an encrypted version prior to requesting host OS 110 to write the page of memory to a persistent storage, such as a hard-disk drive (HDD) or solid state device (SSD). Note that a guest operating system executing within a virtual machine, such as guest OS 150 of virtual machine 140, may request hypervisor 130 to perform an I/O operation, and so hypervisor 130, in instructing host OS 110 to perform an I/O operation, may be acting on behalf of a virtual machine in system 100.

When hypervisor 130 requests host OS 110 to read into memory the page of memory from persistent storage, host OS 110 will read the encrypted page of memory into a location in memory using the token provided to host OS 110 by hypervisor 130.

In an embodiment, after hypervisor 130 revokes from host OS 110 access to the encrypted version of the page in memory, hypervisor 130 decrypts the encrypted version of the page of memory. If a virtual machine requested the performance of the read operation, then hypervisor 130 would then provide that virtual machine access to the page of memory.

In an alternate embodiment, after host OS 110 reads the encrypted page of memory into a set of memory pages, hypervisor 130 copies the encrypted version into a different location in memory to which the host OS 110 does not have permission to access. Hypervisor 130 may copy the encrypted version into the different location in memory either of its own initiative or at the direction of a guest operating system, or as a result of the host presenting a suitable token. Thereafter, hypervisor 130 decrypts the encrypted version of the page of memory at its present location. If a virtual machine requested the performance of the read operation, then hypervisor 130 would then provide that virtual machine access to the page of memory.

In an embodiment, hypervisor 130 may use a cryptographic checksum to ensure data outside the control of hypervisor 130 has not been tampered with. Using a cryptographic checksum, the integrity of resources belonging to or allocated by hypervisor 130 may be ensured. A cryptographic checksum is data that is computed using a set of input data and an algorithm to ensure that the input data has not been modified since the cryptographic checksum was calculated. Embodiments of the invention may employ a wide variety of approaches for obtaining a cryptographic checksum. Various entities may generate the cryptographic checksum, e.g., in some embodiments, hypervisor 130 may generate the cryptographic checksum while in other embodiments a guest operating system or other component may generate the cryptographic checksum and provide it to hypervisor 130. Embodiments of the invention may obtain a cryptographic checksum upon encrypted or unencrypted data.

To illustrate how a cryptographic checksum is used by an embodiment, consider an example involving hypervisor 130 instructing host OS 110 to write a page of memory to persistent storage. In an embodiment, hypervisor 130 generates a cryptographic checksum on a page of memory prior to providing host OS 130 access to the encrypted version of the page of memory. The cryptographic checksum will be used by hypervisor 130 to verify the integrity of the encrypted version of the page of memory. Embodiment of the invention may obtain the cryptographic checksum on the page of memory either before or after encrypting the page of memory. Host OS 110 may then write the cryptographic checksum to a persistent storage contemporaneous with writing the encrypted version of the page of memory to the persistent storage.

Advantageously, the hypervisor 130 may determine, using a cryptographic checksum, whether the integrity of the encrypted version of a page has been violated since leaving the custody of hypervisor 130. The cryptographic checksum may be retrieved by host OS 110 from the persistent storage on which the encrypted version of the data was stored. Host OS 110 may present the cryptographic checksum to hypervisor 130 along with the encrypted version of the data.

Saving and Restoring a Virtual Machine

Figure 2:
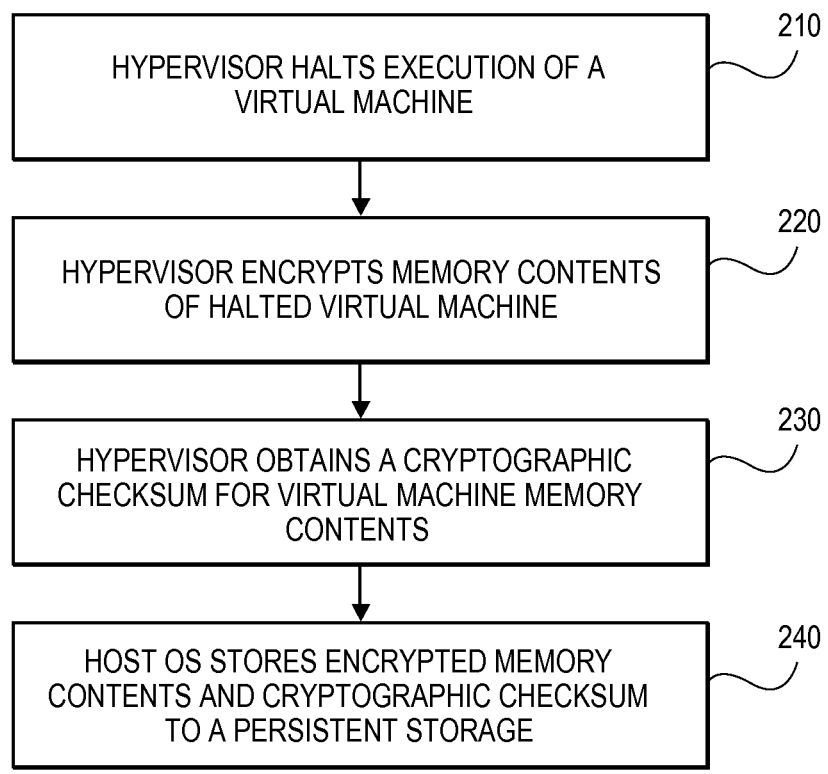
FIG. 2 is a flowchart illustrating the functional steps of saving a virtual machine according to an embodiment of the invention.

Embodiments of the invention enable hypervisor 130 to save and restore entire virtual machines in a manner that preserves the integrity and privacy of the virtual machine. FIG. 2 is a flowchart illustrating the functional steps of saving a virtual machine according to an embodiment of the invention. In step 210, hypervisor 130 halts execution of particular virtual machine. For example, hypervisor 130 may halt the execution of virtual machine 140 of FIG. 1.

In step 220, hypervisor 130 encrypts the contents of memory associated with virtual machine 140 to create encrypted memory contents. Note that the performance of step 220 is optional, as in certain embodiments the contents of memory associated with virtual machine 140 may be stored on disk in a non-encrypted fashion.

In step 230, hypervisor 130 generates or obtains one or more cryptographic checksums for either the encrypted contents of memory for virtual machine 140 (if step 220 is performed) or non-encrypted contents of memory for virtual machine 140 (if step 230 is not performed). Note that step 230 may be performed upon either the unencrypted or encrypted memory contents; as a result, in certain embodiments step 230 may be performed before 220.

In step 240, host OS 110 stores the memory contents (in an encrypted or non-encrypted fashion) and any cryptographic checksums generated in step 130 on a persistent storage, such as a hard-disk drive (HDD) or a solid state device (SSD).

Once a virtual machine has been saved to a persistent storage, it may be restored to memory to facilitate the resumption of its operation. In an embodiment, to restore a virtual machine stored on a persistent storage, host OS 110 reads the memory contents (which may or may not be encrypted) for the virtual machine from the persistent storage into the memory of a newly instantiated virtual machine container. After removing access to the memory contents from host OS 110, hypervisor 130 may, in any order: (a) measure the integrity of the memory contents using the cryptographic checksum and (b) decrypt, if necessary, the memory contents for the particular virtual machine.

Alternately, in another embodiment, to restore a virtual machine stored on a persistent storage, rather than expressly revoking access from host OS 110 to the location in memory to which the memory contents are copied, host OS 110 may copy the memory contents into a location in memory to which host OS 110 cannot access. Thereafter, the integrity and privacy of the memory contents may be assessed, and absent any corruption or intrusion to the memory contents, the requesting party may safely access the memory contents. Saving and restoring a virtual machine in this fashion may be used by certain embodiments in starting up each virtual machine. In other words, each new virtual machine may be a restore of a previously saved virtual machine. In this way, a newly instantiated virtual machine may have a desired set of characteristics. In another approach, the desired memory contents of a newly instantiated virtual machine may be comprised within hypervisor 130; when a new virtual machine is started, the memory contents for that virtual machine may be supplied by hypervisor 130.

In an embodiment, the memory contents copied into memory may correspond to an initial state of memory for a restored virtual machine prior to booting the virtual machine. This initial state of memory may comprises a BIOS or UEFI firmware, and possibly other firmware, and a set of configuration data to ensure the newly instantiated virtual machine may have a desired set of characteristics.

Reducing Memory

Hypervisor 130 may determine that it is necessary to reduce its memory consumption. Alternately, host OS 110 may request hypervisor 130 to reduce the amount of memory used by hypervisor 130. Hypervisor 130 will evict memory pages used by itself or a virtual machine to reduce the amount of memory consumed by hypervisor 130. When hypervisor 130 decides to evict a set of memory pages from a particular virtual machine, hypervisor 130 encrypts the set of memory pages and obtains a cryptographic checksum for the encrypted memory pages. Hypervisor 130 then instructs host OS 130 to persistently store the encrypted memory pages and the cryptographic checksum to a persistent storage. Thereafter, hypervisor may safely evict the set of memory pages from memory and reduce, if desired, an amount of memory allocated to hypervisor 130, and thus return the page to the host.

When hypervisor 130 decides to read a set of evicted memory pages back into the memory of a particular virtual machine, hypervisor 130 instructs host OS 130 to read the memory pages (which will be encrypted) and a cryptographic checksum from a persistent storage. Hypervisor 130 verifies the integrity of the encrypted memory pages using the cryptographic checksum, and decrypts the encrypted memory pages. Hypervisor 130 may then provide access to the decrypted memory pages to the particular virtual machine.

Verifying Integrity of the Hypervisor

In an embodiment, the integrity of hypervisor 130 may be verified loading hypervisor 130 into memory. In an embodiment, after loading hypervisor 130 into memory, host OS 110 may relinquish access to the memory belonging to hypervisor 130. Thereafter, a cryptographic measurement of hypervisor 130 may be obtained using hardware support.

Hypervisor 130 may participate in attesting a measured state of a restored virtual machine (regardless of whether the restored virtual machine was stored on disk in an encrypted or non-encrypted fashion) alongside its own state to a third party. The measured state of hypervisor 130 may be recorded in the Trusted Platform Module, which is a dedicated microprocessor designed to secure hardware by integrating cryptographic keys into devices.

Hardware Mechanisms

Figure 3:
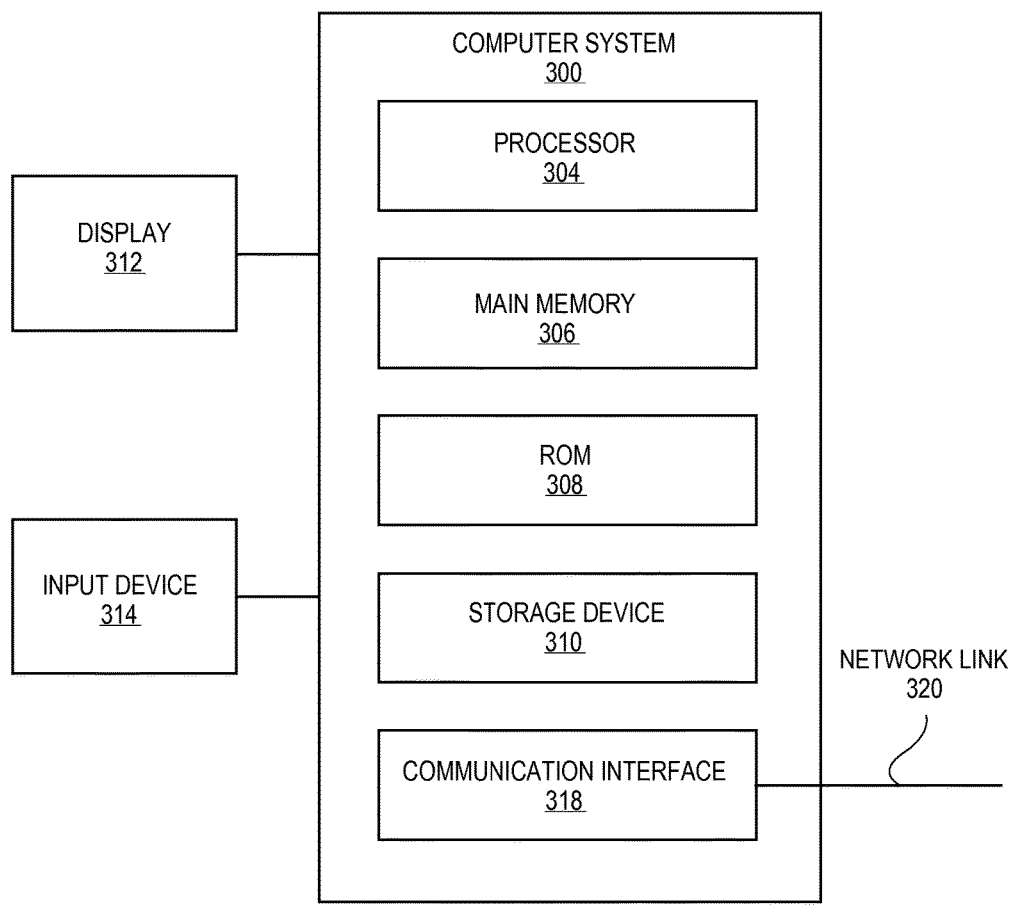
FIG. 3 is a block diagram that illustrates a computer system upon which an embodiment of the invention may be implemented.

In an embodiment, system 100 of FIG. 1 may be implemented on a computer system. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions, which when executed by one or more processors, cause:
   a host operating system managing a set of resources;
   preventing the host operating system from accessing a portion of said set of resources comprising a set of memory pages belonging to a hypervisor or allocated by the hypervisor to prevent the host operating system from violating the privacy and integrity of said portion of said set of resources, wherein preventing comprises:
   in response to receiving a request, from a virtual machine, to read one or more memory pages in said set of resources managed by said host operating system, the hypervisor requesting the one or more memory pages from the host operating system,
   the host operating system providing said one or more memory pages managed by the host operating system to the hypervisor, and
   after the hypervisor receives said one or more memory pages from the host operating system, the hypervisor using a hardware component that establishes and enforces constraints on what areas of memory the host operating system is allowed to access to protect the one or more memory pages from the host operating system by preventing said host operating system access to an unencrypted version of said one or more memory pages.

2. The one or more non-transitory computer-readable storage mediums of claim 1, wherein preventing the host operating system from accessing said portion comprises:
   executing the hypervisor in said set of memory pages; and
   establish execution of the host operating system into a virtual machine container that does not have sufficient privilege to access any portion of said set of memory pages.

3. The one or more non-transitory computer-readable storage mediums of claim 1, wherein said set of resources includes one or more of memory, scheduling access to a central processing unit (CPU), and access to one or more input/output devices.

4. The one or more non-transitory computer-readable storage mediums of claim 1, wherein execution of the one or more sequences of instructions further comprises:
   preventing devices under the control of the host operating system from performing an unauthorized direct memory access (DMA) to said portion of resources.

5. The one or more non-transitory computer-readable storage mediums of claim 1, wherein execution of the one or more sequences of instructions further comprises:
   after the hypervisor grants the host operating system temporary access to a particular set of one or more memory pages to allow the host operating system to perform I/O operations, the hypervisor revoking access to said particular set of one or more memory pages from the host operating system.

6. The one or more non-transitory computer-readable storage mediums of claim 1, wherein execution of the one or more sequences of instructions further comprises:

in response to the hypervisor receiving a request from the virtual machine to write a page of memory to a persistent storage, a guest operating system, executing within the virtual machine, encrypting said page of memory to create an encrypted version prior to granting the host operating system access to the encrypted version; and the host operating system writing the encrypted version to a persistent storage.

7. The one or more non-transitory computer-readable storage mediums of claim 1, wherein execution of the one or more sequences of instructions further comprises:

in response to the hypervisor receiving a request from the virtual machine to write a page of memory to a persistent storage, the hypervisor encrypting said page of memory to create an encrypted version prior to granting the host operating system access to the encrypted version; and the host operating system writing the encrypted version to a persistent storage.

8. The one or more non-transitory computer-readable storage mediums of claim 7, wherein execution of the one or more sequences of instructions further comprises:

the hypervisor generating a cryptographic checksum on said page of memory prior to providing the host operating system access to said encrypted version; and the host operating system writing the cryptographic checksum to a persistent storage contemporaneous with the host operating system writing the encrypted version to the persistent storage, wherein said cryptographic checksum is used by the hypervisor to verify the integrity of said page.

9. The one or more non-transitory computer-readable storage mediums of claim 1, wherein execution of the one or more sequences of instructions further comprises:

in response to the hypervisor receiving a request from the virtual machine to read a page of memory from a persistent storage, a host operating system reading an encrypted version of the page of memory from the persistent storage into a location in memory; and after the hypervisor revokes from the host operating system access to the location in memory, the hypervisor decrypting the encrypted version of the page of memory to the page of memory and providing the virtual machine access to the page of memory.

10. The one or more non-transitory computer-readable storage mediums of claim 9, wherein execution of the one or more sequences of instructions further comprises:

the hypervisor determining whether the integrity of said encrypted version has been violated using a cryptographic checksum that was retrieved by the host operating system from the persistent storage.

11. The one or more non-transitory computer-readable storage mediums of claim 1, wherein execution of the one or more sequences of instructions further comprises:

in response to the hypervisor receiving a request from the virtual machine to read a page of memory from a persistent storage, a host operating system reading an encrypted version of the page of memory from the persistent storage into memory;

the hypervisor copying the encrypted version into a location in memory to which the host operating system cannot access; and after the hypervisor decrypts the encrypted version at the location in memory, the hypervisor providing the virtual machine access to the page of memory.

12. The one or more non-transitory computer-readable storage mediums of claim 11, wherein execution of the one or more sequences of instructions further comprises:

the hypervisor determining whether the integrity of said encrypted version has been violated using a cryptographic checksum that was retrieved by the host operating system from the persistent storage.

13. The one or more non-transitory computer-readable storage mediums of claim 1, wherein execution of the one or more sequences of instructions further comprises:

restoring to memory a particular virtual machine stored on a persistent storage by performing:

the host operating system reading said memory contents for the particular virtual machine from the persistent storage medium into memory of a newly instantiated virtual machine container; and the hypervisor measuring said memory contents using a cryptographic checksum.

14. The one or more non-transitory computer-readable storage mediums of claim 13, wherein execution of the one or more sequences of instructions further comprises:

the hypervisor attesting, to another party, (a) a first measured state of the restored particular virtual machine and (b) a second measured state of the hypervisor and its configuration.

15. The one or more non-transitory computer-readable storage mediums of claim 13, wherein the particular virtual machine, after being restored to memory, corresponds to an initial state of memory for the particular virtual machine prior to booting the particular virtual machine, wherein said initial state of memory for the particular virtual machine comprises a BIOS or UEFI firmware and a set of configuration data.

16. The one or more non-transitory computer-readable storage mediums of claim 1, wherein execution of the one or more sequences of instructions further comprises:

after the hypervisor halts execution of a particular virtual machine, the hypervisor (a) encrypting contents of memory associated with the particular virtual machine to create encrypted memory contents; and the host operating system storing the encrypted memory contents on a persistent storage medium.

17. The one or more non-transitory computer-readable storage mediums of claim 16, wherein execution of the one or more sequences of instructions further comprises:

generating a cryptographic checksum for the contents of memory; and the host operating system storing the cryptographic checksum on the persistent storage medium.

18. The one or more non-transitory computer-readable storage mediums of claim 17, wherein execution of the one or more sequences of instructions further comprises:

restoring to memory the particular virtual machine stored on a persistent storage by performing:

the host operating system reading the encrypted contents for the particular virtual machine from the persistent storage medium into memory of a newly instantiated virtual machine container;

after removing access to the encrypted contents from the host operating system, the hypervisor (a) decrypting the encrypted contents for the particular virtual machine and (b) assessing the integrity of the encrypted contents using the cryptographic checksum.

19. The one or more non-transitory computer-readable storage mediums of claim 13, wherein execution of the one or more sequences of instructions further comprises:

the hypervisor attesting, to another party, (a) a first measured state of the restored particular virtual machine and (b) a second measured state of the hypervisor.

20. The one or more non-transitory computer-readable storage mediums of claim 1, wherein execution of the one or more sequences of instructions further comprises:
   upon the hypervisor deciding to evict a set of memory pages from a particular virtual machine, the hypervisor: (a) encrypting the set of memory pages to form encrypted memory pages; and (b) generating a cryptographic checksum for said memory pages; and
   the hypervisor instructing the host operating system to persistently store the encrypted memory pages and the cryptographic checksum to a persistent storage.

21. The one or more non-transitory computer-readable storage mediums of claim 1, wherein execution of the one or more sequences of instructions further comprises:
   upon the hypervisor deciding to read a set of evicted memory pages into memory, the hypervisor (a) instructing the host operating system to read encrypted memory pages and a cryptographic checksum from a persistent storage (b) verifying the integrity of the memory pages using the cryptographic checksum, and (c) decrypting the encrypted memory pages; and
   the hypervisor providing access to the decrypted memory pages to the particular virtual machine.

22. The one or more non-transitory computer-readable storage mediums of claim 1, wherein execution of the one or more sequences of instructions further comprises:
   verifying the integrity of the hypervisor when loading the hypervisor into memory by performing:
      the host operating system loading the hypervisor into memory;
      the host operating system relinquishing access to the memory belonging to the hypervisor; and
      using hardware support for performing a cryptographic measurement of the hypervisor.

23. The one or more non-transitory computer-readable storage mediums of claim 1, wherein execution of the one or more sequences of instructions further comprises:
   prior to booting the host operating system, reserving a portion of machine memory which the host operating system cannot access; and
   after instantiating a main hypervisor component, the main hypervisor component executing within said portion of machine memory.

24. An apparatus for ensuring the privacy and integrity of a hypervisor from a host operating system, comprising:
   one or more processors; and
   one or more non-transitory computer-readable mediums storing one or more sequences of instructions, which when executed by the one or more processors, cause:
      the host operating system managing a set of resources; and
      preventing the host operating system from accessing a portion of said set of resources comprising a set of memory pages belonging to a hypervisor or allocated by the hypervisor to prevent the host operating system from violating the privacy and integrity of said portion of said set of resources,
   wherein preventing comprises:
      in response to receiving a request, from a virtual machine, to read one or more memory pages in said set of resources managed by said host operating system, the hypervisor requesting the one or more memory pages from host operating system,
      the host operating system providing said one or more memory pages managed by the host operating system to the hypervisor, and
      after the hypervisor receives said one or more memory pages form the host operating system, the hypervisor using a hardware component that establishes and enforces constraints on what areas of memory the host operating system is allowed to access to protect the one or more memory pages from the host operating system by preventing said host operating system access to an unencrypted version of said one or more memory pages.

25. A method for ensuring the privacy and integrity of a hypervisor, comprising:
   a host operating system managing a set of resources; and
   preventing the host operating system from accessing a portion of said set of resources comprising a set of memory pages belonging to the hypervisor or allocated by the hypervisor to prevent the host operating system from violating the privacy and integrity of said portion of said set of resources,
   wherein preventing comprises:
      in response to receiving a request, from a virtual machine, to read one or more memory pages in said set of resources managed by the host operating system, the hypervisor requesting the one or more memory pages from the host operating system,
      the host operating system providing said one or more memory pages managed by the host operating system to the hypervisor, and
      after the hypervisor receives said one or more memory pages from the host operating system, the hypervisor using a hardware component that establishes and enforces constraints on what areas of memory the host operating system is allowed to access to protect the one or more memory pages from the host operating system by preventing said host operating system access to an unencrypted version of said one or more memory pages.

* * * * *